US010275601B2

(12) United States Patent
Smith (10) Patent No.: US 10,275,601 B2
(45) Date of Patent: Apr. 30, 2019

(54) FLAW ATTRIBUTION AND CORRELATION

(71) Applicant: Veracode, Inc., Burlington, MA (US)

(72) Inventor: Bradford M. Smith, Fountain Valley, CA (US)

(73) Assignee: Veracode, Inc., Burlington, MA (US)

( * ) Notice: Subject to any disclaimer, the term of this patent is extended or adjusted under 35 U.S.C. 154(b) by 141 days.

(21) Appl. No.: 15/176,911

(22) Filed: Jun. 8, 2016

(65) Prior Publication Data

US 2017/0357809 A1    Dec. 14, 2017

(51) Int. Cl.

| G06Q 10/06 | (2012.01) |
| G06F 11/36 | (2006.01) |
| G06F 21/57 | (2013.01) |
| G06F 21/51 | (2013.01) |
| G06F 21/52 | (2013.01) |
| G06F 8/75 | (2018.01) |

(52) U.S. Cl.
CPC .............. *G06F 21/577* (2013.01); *G06F 8/75* (2013.01); *G06F 11/3604* (2013.01); *G06F 21/51* (2013.01); *G06F 21/52* (2013.01); *G06Q 10/06398* (2013.01); *G06F 2221/033* (2013.01)

(58) Field of Classification Search
CPC ........ G06F 8/70; G06F 11/3604; G06F 21/50; G06F 21/51; G06F 21/52; G06F 21/577; G06F 2221/033; G06Q 10/06398
See application file for complete search history.

(56) References Cited

U.S. PATENT DOCUMENTS

| 9,305,279 | B1 | 4/2016 | Menzel | |
| 2003/0187723 | A1* | 10/2003 | Hadden | G06Q 10/06398 705/7.42 |
| 2006/0123389 | A1* | 6/2006 | Kolawa | G06F 11/3616 717/101 |
| 2009/0070734 | A1* | 3/2009 | Dixon | G06F 8/71 717/102 |
| 2009/0138843 | A1* | 5/2009 | Hinton | G06F 8/74 717/101 |
| 2011/0055799 | A1* | 3/2011 | Kaulgud | G06F 11/3616 717/101 |
| 2011/0276354 | A1* | 11/2011 | Bijani | G06Q 10/00 705/7.11 |
| 2014/0068554 | A1 | 3/2014 | Novak et al. | |
| 2015/0309790 | A1* | 10/2015 | Henriksen | G06F 17/30106 717/121 |

(Continued)

OTHER PUBLICATIONS

International Search Report and Written Opinion for International Application No. PCT/US2017/036502 dated Sep. 21, 2017 (9 pages).

*Primary Examiner* — Khang Do (74) *Attorney, Agent, or Firm* — Gilliam IP PLLC (57) ABSTRACT

In a system for attributing one or more vulnerabilities in a software application to one or more developers, information identifying the source of a vulnerability is obtained from a vulnerability report. From a repository, developer-related information associated with the identified source is obtained. One or more developers are selected from the developer-related information according to one or more specified rules, and the defect is attributed to the selected developer(s). Attribution of the defect may indicate that the developer(s) contributed to introduction of the defect or to remedying the defect.

16 Claims, 3 Drawing Sheets

(56) References Cited

U.S. PATENT DOCUMENTS

| | | |
|---|---|---|
| 2016/0098271 A1 | 4/2016 | Henriksen et al. |
| 2016/0140015 A1* | 5/2016 | Baars .................. G06F 11/3608 717/132 |
| 2016/0162288 A1* | 6/2016 | Henriksen ........... G06F 11/3604 717/122 |
| 2017/0091071 A1* | 3/2017 | Chitale ............... G06F 11/3692 |

* cited by examiner

FLAW ATTRIBUTION AND CORRELATION

FIELD OF THE INVENTION

This disclosure generally relates to vulnerability assessment of computer systems and, more particularly, to systems and methods for determining contribution of one or more software developers to introduction and/or remediation of software vulnerabilities.

BACKGROUND OF THE INVENTION

Software applications typically include flaws or defects, causing the software to operate in an unintended or undesired manner. Sometimes, a developer or a group of developers may introduce flaws/defects purposefully, so as to facilitate misuse of the software system/application and/or to facilitate unauthorized access to the data managed or analyzed by the software system/application. Typically, however, the flaws/defects in the code are introduced inadvertently and unintentionally. For example, a flaw may be introduced due to a programming error, or because the code developer failed to comply with a recommended coding practice. Sometime, a flaw is introduced because a developer is inexperienced and does not have the required proficiency in the computation logic to be implemented by the software and/or the programming language.

Static and/or dynamic vulnerability analysis techniques that can analyze the source code and/or one or more compiled binary files corresponding to a software application can be used to detect any vulnerabilities in the software application. A static analyzer that can analyze one or more compiled binary files corresponding to a software application is useful at least in situations where the source code is unavailable for a number of reasons, e.g., when the owner of the source code wishes not to disclose the source code to the tester performing the static analysis, when a portion of the binary files is obtained from a third party and the corresponding source code is not available from the third party, etc.

Dynamic analysis typically involves at least a partial execution of one or more binary files (also called binaries), and can detect flaws in the code by analyzing results produced by the software in response to one or more stimuli or inputs. As used herein, binary files are not limited to machine code only and may include files that are derived by processing source code and that include representations that are not source code representations, such as byte code, object code, intermediate representation, etc., where these representations are dependent on the respective programming languages used.

Large software applications/systems are often developed by several, e.g., 2, 5, 10, 16, 25, 40, 70, or even more developers. The developers are generally responsible for not only writing or specifying portions of the software application but also for maintenance, such generally includes remedying defects identified via code analysis and/or testing and reported by users. A typical software application may include dozens, hundreds, thousands, hundreds of thousands, or even more defects. Various static and dynamic analyzers can identify many of these defects, but usually little information, if any at all, is available from a static and/or dynamic analysis report that can readily identify which particular developer introduced a particular defect or remedied a certain defect. Such information can be valuable when the number of developers and number of defects are large, in order to minimize the introduction of defects and thereby to improve the quality of the software application.

SUMMARY OF THE INVENTION

In various embodiments, one or more defects identified via analysis and/or testing of a software application can be attributed to one or more developers. This is achieved, at least in part, by correlating source information in a defect report with information obtained from a repository, where such information indicates the actions taken by various developers during the creation and/or management of source code corresponding to the software application. Once defects and/or remedies thereof are attributed to developers, statistics that can identify developers who introduce more defects than others, or who remedy more defects than others, or those who improved in a certain time period by introducing fewer defects in that time period relative to a prior time period, can be computed. These statistics can be beneficial in improving the overall quality of the software application.

Accordingly, in one aspect, a method is provided for attributing a vulnerability in a software application to a developer. The method includes the steps of: obtaining a current vulnerability report for a software application, and extracting from the current report, information about a vulnerability and a descriptor specifying a portion of source code of the software application associated with the vulnerability. The method also includes identifying from a repository, a set of developers associated with the portion of the source code, and attributing the vulnerability to a first developer in the set of developers.

The information about the vulnerability may include either an indication of presence of the vulnerability in the software application, or an indication of cure of the vulnerability in the software application. The descriptor may specify at least one of a source file name, a line number in a source file, a class in a source file, a method in a source file, and a function in a source file. In some embodiments, the method further includes obtaining a previous vulnerability report for the software application, where the previous report lacks information about the vulnerability. The method may include selecting from the set of developers a subset of developers that are associated with the portion of the source code at a time later than a timestamp of the previous vulnerability report, and selecting the first developer from the subset.

In some embodiments, the method further includes obtaining a previous vulnerability report for the software application, where the previous report includes information about the vulnerability, and the current vulnerability report lacks information about the vulnerability. In addition, the method may include selecting from the set of developers a subset of developers that are associated with the portion of the source code at a time later than a timestamp of the previous vulnerability report, and selecting the first developer from the subset. In these embodiments, the first developer is attributed for remedying the vulnerability, also called flaw or a defect.

The method may include selecting the first developer from the set of developers using metadata in the repository, where the metadata is associated with the portion of the source code. Such metadata may include commit messages and/or information indicting type of change made by a developer, e.g., whether the change is related to formatting, fixing another defect, improvement of a functionality, or introduction of new functionality. Obtaining the current vulnerability report may include performing one or more of static analysis, dynamic analysis, and manual analysis of the software application.

In some embodiments, the method further includes computing a first vulnerability statistic corresponding to the first developer. The first vulnerability statistic may include at least one of: (i) a count of vulnerabilities attributed to the first developer, and (ii) a frequency at which vulnerabilities are attributed to the first developer. The method may also include determining a type of the vulnerability, and the first vulnerability statistic may be associated with the determined vulnerability type. The step of computing the first vulnerability statistic may include accounting for vulnerabilities attributed to the first developer during a specified time period. In some embodiments, the method includes obtaining a completion time indicating a time at which the first developer completed a learning module, and the specified time period may exclude a time period prior to the completion time. The method may include computing a second vulnerability statistic corresponding to the first developer, where the second vulnerability statistic account for vulnerabilities attributed to the first developer during another time period that excludes time after the completion time. In addition, the method may include comparing the first and second vulnerability statistics.

In some embodiments, the method includes comparing the first vulnerability statistic corresponding to the first developer with a second vulnerability statistic corresponding to a second developer. In some embodiments, the method may include aggregating respective vulnerability statistics corresponding to a number of developers, each of which is associated with an organizational entity.

In another aspect, a computer system for attributing a vulnerability in a software application to a developer includes a first processor and a first memory coupled to the first processor. The first memory includes instructions which, when executed by a processing unit that includes the first processor and/or a second processor, program the processing unit, that is in electronic communication with a memory module that includes the first memory and/or a second memory, to: obtain a current vulnerability report for a software application, and extract from the current report, information about a vulnerability and a descriptor specifying a portion of source code of the software application associated with the vulnerability. The processing unit is also programmed to identify from a repository, a set of developers associated with the portion of the source code, and to attribute the vulnerability to a first developer selected from the set of developers. In various embodiments, the instructions can program the processing unit to perform one or more of the method steps described above.

In another aspect, an article of manufacture that includes a non-transitory storage medium has stored therein instructions which, when executed by a processor program the processor, which is in electronic communication with a memory, for attributing a vulnerability in a software application to a developer. To this end, the instructions program the processing unit to: obtain a current vulnerability report for a software application, and extract from the current report, information about a vulnerability and a descriptor specifying a portion of source code of the software application associated with the vulnerability. The processing unit is also programmed to identify from a repository, a set of developers associated with the portion of the source code, and to attribute the vulnerability to a first developer selected from the set of developers. In various embodiments, the stored instructions can program the processor to perform one or more of the method steps described above.

BRIEF DESCRIPTION OF THE DRAWINGS

Various embodiments of the present invention taught herein are illustrated by way of example, and not by way of limitation, in the figures of the accompanying drawings, in which.

DETAILED DESCRIPTION

In some software-development environments, developers may be assigned to different teams, where each team is generally responsible for developing and/or maintaining one or more units or modules of the overall software application. Different developers may have different skill sets and levels of expertise with respect to the particular computations performed by the modules developed by those developers. For example, in a banking application, some developers may have expertise in financial transactions while other developers may have expertise in data encryption. In a software system to be used with a medical device, some developers may have expertise in the fields of medical diagnosis and treatment, while other developers may have knowledge about statistical analysis of data or graphical representation of observed data on a screen. One or more developers may contribute to the development of one or more modules and one or more modules typically include code written or specified by more than one developers from the same team and/or from different teams. Some software applications may include computer-generated code, where the developers only provide a model for the generation of the code.

Figure 1:
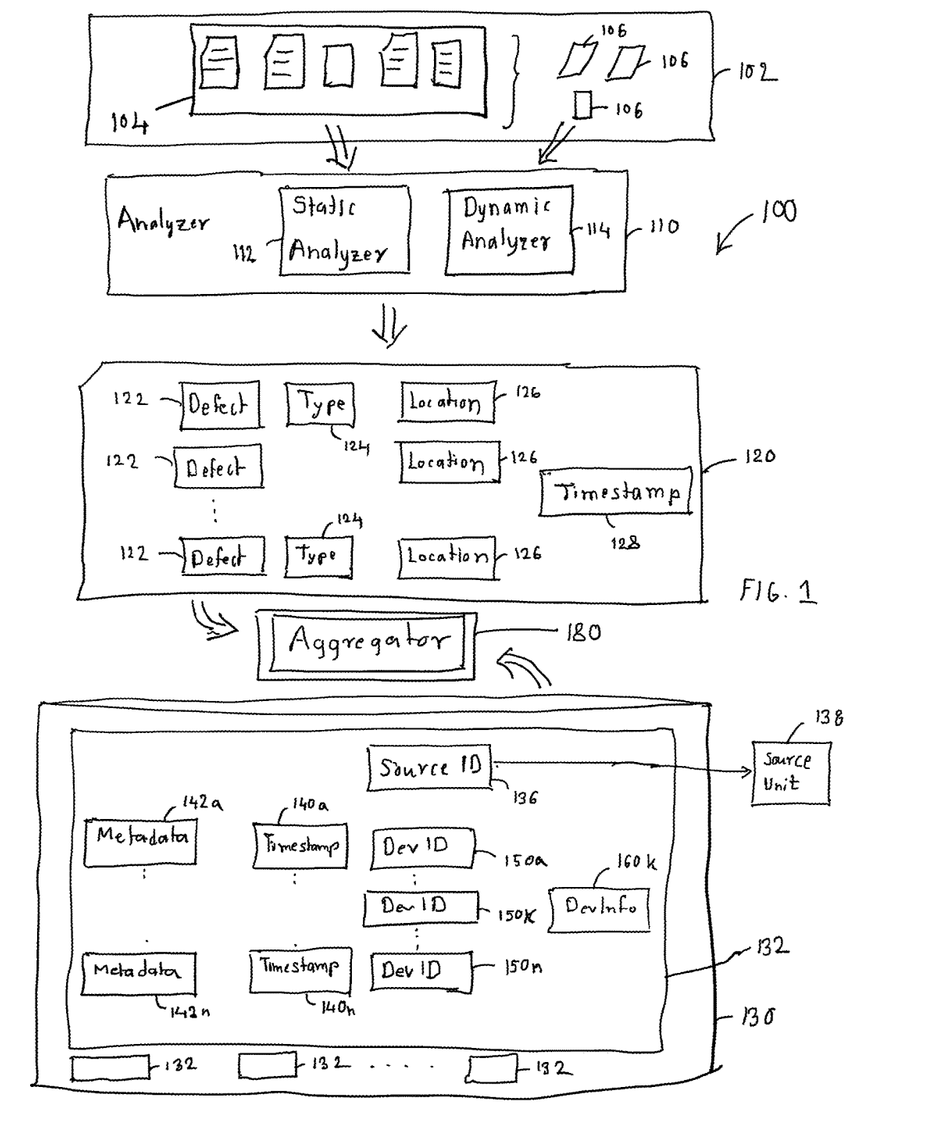
FIG. 1. schematically depicts a system for attributing defects to developers according to one embodiment.

With reference to FIG. 1, in a vulnerability analysis system 100, a software system/application 102 in which vulnerabilities are to be detected is analyzed by an analyzer 110. The source code 104 for the software application 102 may include instructions written in one or more programming languages, one or more scripting languages, scripts, models such as those specified in Unified Modeling Language (UML), compilation scripts, supporting documentation, databases such as a table of error codes and error messages, etc. One or more binaries 106 and/or other files such as script files may be generated using the source code 104. The analyzer 110 may include a static analyzer 112 and/or a dynamic analyzer 114. The analyzer 110 may analyze the source code 104 and/or the binaries 106 to produce a report 120 that includes a list of defects/vulnerabilities/flaws 122 in the software application 102. For each defect/vulnerability/flaw the type 124 thereof may be included. In some embodiments, the vulnerability type is described as a common weakness enumeration (CWE) identifier. The defect/vulnerability report 120 generally includes, for each identified vulnerability/defect/flaw 122, additional information 126 such as the source file and/or binary in which that particular vulnerability was found, location identifiers, such as line numbers, a class, a method, or a function in which the detect/vulnerability was found, etc. A timestamp 128 that can indicate, e.g., a day and/or a time at which the software application 102 was analyzed may also be included in the defect/vulnerability report 120.

A repository 130 includes records 132 relating to the source code 104 of the software application 102. A record 132 generally includes a source code identifier 136 identifying at least a portion of the source code, generally referred to herein as a source unit 138, and one or more developer identifiers 150 identifying one or more developers who have touched (e.g., created or modified) the source unit 138. In general, a source unit can be a library, a file, or a module that includes one or more files or sections of one or more files or libraries. As such, the source code identifier 136 may include a library name, a filename, and/or a module name. In some embodiments, the source code identifier 136 also includes one or more line numbers or one or more ranges of line numbers (e.g., 573-628; 1014-1020; etc.), and/or the name of a class, a method, a data structure, and/or a function.

A developer identifier 150 may include the name or email of a developer and/or an identifier (ID) such as an employee ID, a contractor ID, etc. The developer ID 150 may also include the name and/or ID of an organization, a group, or a team to which the developer belongs. For example, some portions of the source code may be developed/maintained by employees of an organization providing the software application, while some portions may be obtained from other organizations, and are therefore developed by non-employees.

A record 132 typically includes one or more timestamps 140 (e.g., dates and times) indicating when a particular developer touched (e.g., created, modified, deleted, checked out, checked in, etc.) the corresponding source unit. As more than one developers may touch the same source unit at different times, different timestamps 140a-140n corresponding to different developer IDs 150a-150n may be associated with a source unit 138. In some embodiments, a record 132 may include metadata 142a-142n corresponding to the developer IDs 150a-150n, respectively. The metadata 142 may indicate a developer action, e.g., whether the developer created, modified, deleted, checked out, and/or checked in, the source unit 138. The metadata 142 may also include a narrative or additional information. The additional information may describe whether a change was related to a format of the data received and/or output by the software application 102, or whether the change was to a functionality implemented by the source unit 138, the type of functionality, such as computation, communication, storage, duplication, caching, etc. The additional information in the metadata 142 may also describe if a developer added a new feature or whether the developer fixed or circumvented a flaw or a defect. An ID of the corresponding flaw/defect may also be included.

In some cases, two or more developers may modify different portions of a library, file, or a module at the same time, and these changes may be merged automatically and/or manually. If the source code identifier 136 identifies lines number(s) or range(s) of line number(s), class(es), method(s), data structure(s), function(s), etc., a different developer ID 150 and/or a different timestamp 140 may be associated with different source code IDs 136, even though the portion of the source code associated with those source code IDs is part of a single library, file, or a module. In some cases, two or more developers may simultaneously modify the same line(s), or other portions such as classes, methods, data structures, functions, etc., of a particular file. In that case, the source code check in process typically serializes the check-ins from those developers. As such, two or more developer IDs 150 and two or more different timestamps 140 may be associated with a particular source unit.

In some embodiments, the repository 130 includes information about developers and/or groups or teams of developers. For example, developer information 160k corresponding to a developer identified by developer ID 150k may indicate the skill level(s) of the developer relating to one or more skills, the period of time (e.g., in days, months, years, etc.) the developer has spent developing the software application 102 and/or one or more source units thereof, and/or an organization to which the developer belongs, e.g., whether the developer is an employee of the entity providing the software application 102 or a contractor. The developer information 160k may also include the identity of a team of the organization to which the developer belongs. Additionally or in the alternative, the developer information 160k may include indication(s) of any training related to the field of the software application 102 and/or one or more source units thereof that the developer has completed or has not completed, any training related to programming languages, scripting languages, compilers that the developer has completed or has not completed, etc. The attributer 180 receives one or more software analysis reports and information from the repository, and attributes one or more defects/flaws to one or more developers, as described below.

Figure 2A:
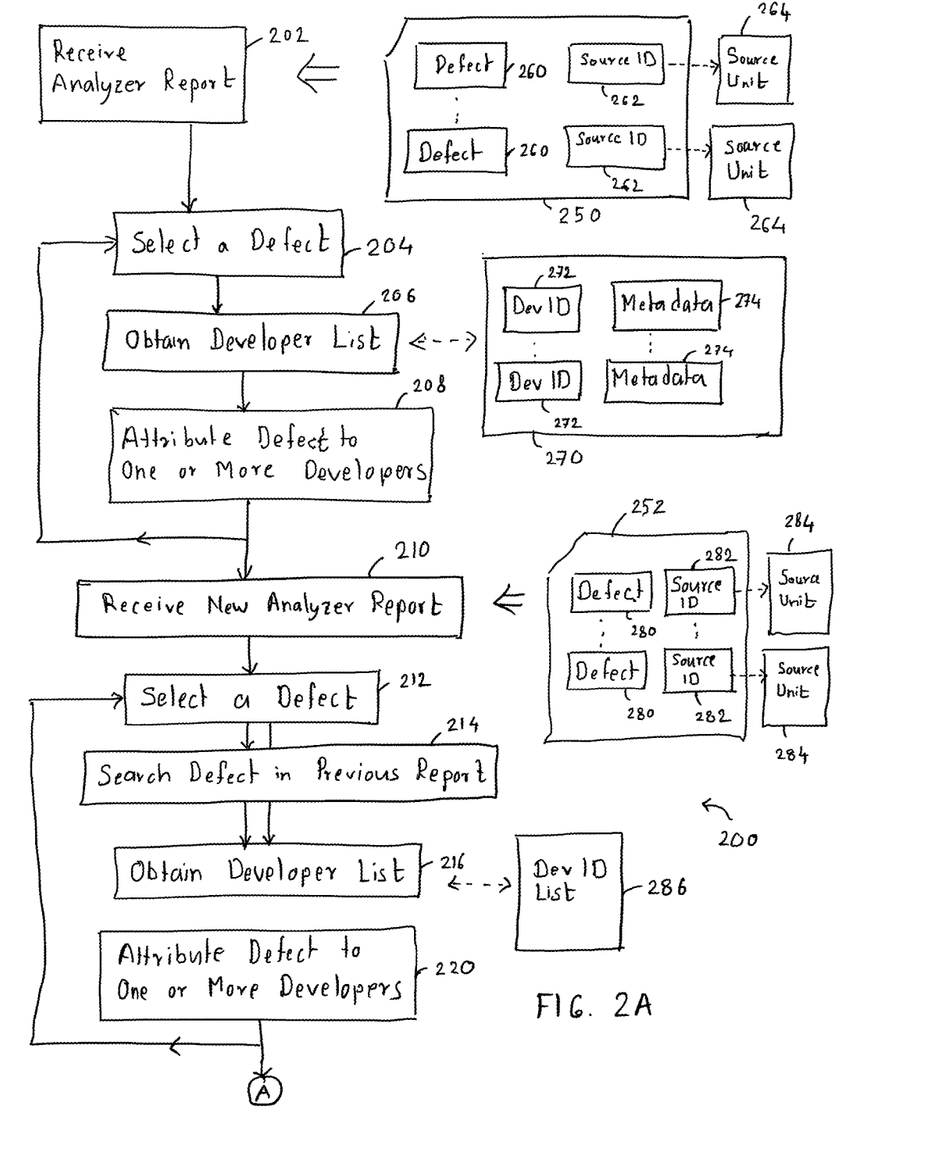
FIGS. 2A and 2B depict a process of attributing defects to developers, according to different embodiments.
Figure 2B:
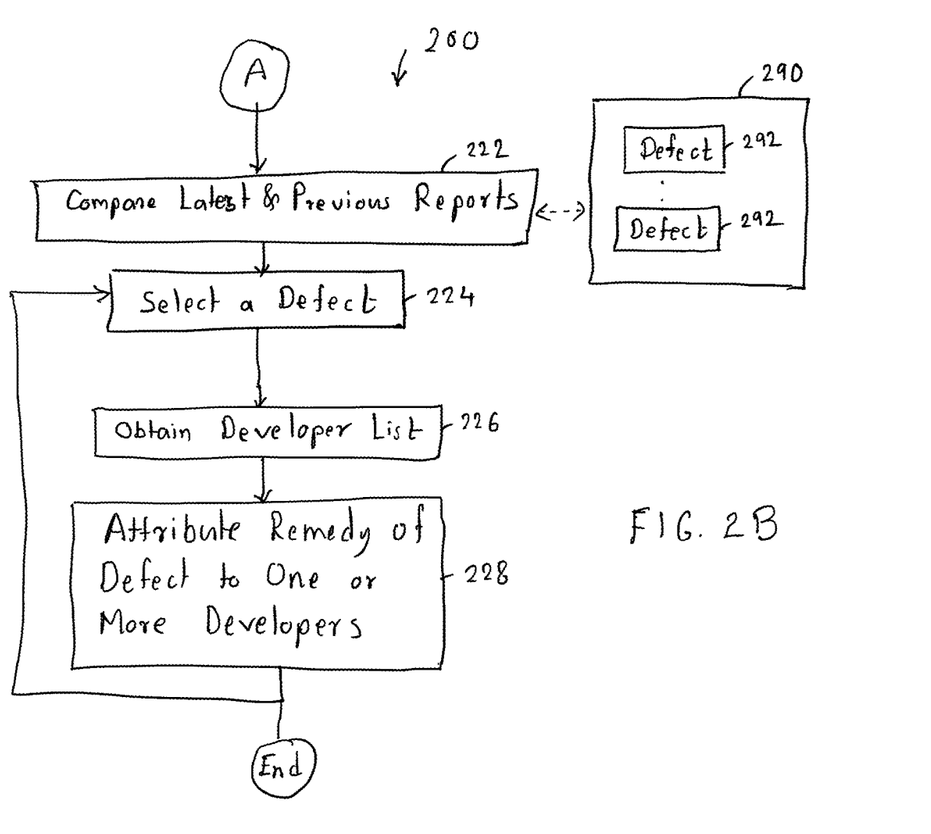

With reference to FIGS. 1 and 2, in a process 200 implemented in some embodiments, analysis of the software application 102 is performed by the analyzer 110, and a report 250 is received, at step 202. In step 204, one of the defects/flaws in the report, e.g., the defect/flaw 260, is selected. For the selected defect/flaw, a source identifier/location 262 is obtained from the report 250. In step 206, a list of developer IDs 270 identifying developers who have touched a source unit 264 identified by the source identifier 262 is obtained from the repository 130, e.g., by querying or analyzing the repository. One or more of the developers in that list are designated as having introduced the selected defect/flaw, in step 208.

Various techniques may be used for attributing the selected defect/flaw to one or more developers. For example, the defect/flaw may be attributed to one or more developers who were the latest to touch the source unit 264, and/or to one or more developers who have most frequently touched the source unit 264. Alternatively, or in addition, the defect/flaw may be attributed to one or more developers who touched the source unit 264 on or after a specified date, and/or to one or more developers who touch the source unit 264 at a frequency at least equal to a threshold frequency. The threshold frequency may be specified in terms of number of touches per hour, day, week, month, or another suitable time period.

In some embodiments, as an alternative to the techniques described above, or additionally, any metadata 274 associated with each developer ID 272 in the list 270 is analyzed. From such metadata, developers who made formatting changes may be excluded. In some cases, developers who added new functionality, as indicated by the metadata 274, may be selected. In other cases, developer(s) who fixed a defect, as indicated by the metadata 274, may be selected. In some cases, developer(s) who fixed a defect are selected only if the defect identified as fixed in the metadata 274 is the same as the selected flaw/defect 260, or if the two defects are of the same type. In some cases, the metadata is merely reported for final attribution of the flaw/defect to a developer. After attributing the selected defect/flaw to one or more developers, another defect/flaw is selected from the report 250 in the step 204 and the steps 206 and 208 are repeated so as to attribute the newly selected flaw/defect to a developer. The steps 204 through 208 may be iterated until all defects/flaws in the report 250 are attributed to one or more developers.

In some embodiments, analysis of the software application 102 is performed by the analyzer 110 again, at a different time, and another report 252, that includes another list of flaws/defects is received at step 210. One or more additional reports that were generated via prior analysis of the application, e.g., the report 250, may also be available. Analysis such as that performed in the step 210 may be performed periodically (e.g., daily, weekly, twice a day, monthly, etc.) or according to certain events such as prior to the release of a new version, after a substantial change in and/or addition to application features, etc.

In step 212, one of the defects/flaws in the new report 252, e.g., a flaw/defect 280, is selected. For the selected defect/flaw, a source identifier 282 is obtained from the report 252. In the optional step 214, a search for the selected flaw/defect 280 is performed in a previously obtained report, for example, in the report 250. In step 216, a list of developer IDs 286 identifying developers who have touched a source unit 284 identified by the source identifier 282 is obtained from the repository 130, e.g., by querying or analyzing the repository.

In the embodiments in which the step 214 is performed, if the flaw/defect 280 is not found in the previously obtained report, it is likely that any changes made to the source code after the previous report was obtained caused the flaw/defect 280. Therefore, in some embodiments, in step 216, a list of developer IDs 286 identifying developers who have touched a source unit 284 identified by the source identifier 282 after the previous report 250 was generated is obtained from the repository 130. In some embodiments, however, the time at which the previous report was generated is not used to filter out the developers who touched the source unit 284.

One or more of the developers corresponding to the list 286 may be attributed with the flaw/defect 280 in step 220 using one or more of the techniques described above in the step 208. The steps 212 through 220 may be iterated until all defects/flaws in the list 262 are attributed to one or more developers.

In some embodiments, in step 222, the latest report 252 is compared with a previous report 250 and a list 290 of flaws/defects that were found in the previous report 250 but that were not found in the latest report 252 is generated. It is likely that any changes made to the source code after the previous report 250 was obtained caused the flaws/defects in the list 290 to be remedied. Therefore, in some embodiments, in step 224, a defect 292 from the list 290 is selected and the corresponding source identifier is obtained from the previous report 250. In step 226, a list of developer IDs identifying developers who touched a source unit identified by the source identifier identified in the step 224 after the previous report 250 was generated is obtained from the repository 130. One or more of the developers corresponding to this list of developer IDs may be attributed with remedying the selected flaw/defect, in step 228. One or more of the techniques described above in the step 208 may be used to select the developer to whom the remedy is attributed. The steps 224 through 228 may be iterated until all of the remedied defects/flaws in the list 290 are attributed to one or more developers.

In some embodiments, after one or more defects/flaws are attributed to one or more developers, developer statistics are computed. For example, for one or more developers a total number of defects/flaws attributed to each developer and/or a frequency of defect attribution may be computed. The frequency can be per day, per week, per month, or any other selected development period. The total number of attributions can be a running total since the first-obtained report was analyzed as described above, or the total may correspond to a specified time period such as year-to-date, past year, since the release of a previous version, from the date of hire of the developer, from the date on which the developer was assigned to a particular module of the software application, etc. In generating attribution statistics, one statistic may be computed for attribution indicating introduction of defects/flaws and another statistic may be computed for attribution indicating remedy of defects/flaws.

In some cases, a statistic obtained during one period, e.g., before a developer completed certain training, may be compared with a corresponding statistic obtained during another period, e.g., six months after the developer completed certain training. The information about the developer's training can be obtained from the source code repository or from another database. A comparison of these two statistics can be used to determine the effectiveness of the training obtained by a particular developer for that developer.

In some cases, the attribution statistics from developers belonging to one group are aggregated and the attribution statistics from developers belonging to another group are also aggregated. The two aggregated statistics may be compared to generate information about the groups. For example, one group may include developers who have not obtained certain training and the other group may include developers who have obtained that training. The two aggregated statistics may be compared to determine the overall effectiveness of the training.

In another case, one group may include developers assigned to develop one kind or kinds of software modules, such as user interface, cryptography, statistical analysis, etc., and the other group may include developers assigned to develop a different kind or kinds of software modules such as transaction processing, billing, control of equipment, etc. A comparison of the aggregated statistics can reveal whether one kind of software modules is more susceptible to vulnerabilities than others. In yet another example, one group may include developers who are employees of the organization providing the software application and/or contracted from one contracting organization. The other group may include developers who are contracted from another organization. A comparison of the aggregated statistics can reveal whether the employees and/or contractors contracted from one organization is more or less proficient than contractors contracted from another organization.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communications protocols to facilitate communications between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communications with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communications protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

Accordingly, we claim:

1. A method comprising:
comparing vulnerability reports for a software application to determine matching and non-matching vulnerabilities across the vulnerability reports, wherein the vulnerability reports have different timestamps;
for a non-matching vulnerability,
determining a source unit identifier from a descriptor of the vulnerability indicated in a first of the vulnerability reports, wherein the source unit identifier identifies a source code unit of the software application;
querying a repository with the source unit identifier and a timestamp of the first vulnerability report to identify a set of one or more developers associated with the source code unit at a time matching the timestamp or later than the timestamp of the first vulnerability report; and
attributing the non-matching vulnerability to at least a first of the set of developers.

2. The method of claim 1, wherein the descriptor specifies at least one of a source file name, a line number or line numbers in a source file, a class in a source file, a method in a source file, and a function in a source file.

3. The method of claim 1, further comprising performing at least one of static analysis and dynamic analysis of the software application at different times to generate the vulnerability reports.

4. The method of claim 1, further comprising, for matching and non-matching vulnerabilities, computing a first vulnerability statistic across the vulnerabilities based on attribution to developers and based on metadata of the developers to which the vulnerabilities are attributed.

5. The method of claim 4, wherein the first vulnerability statistic comprises at least one of:

a count of vulnerabilities attributed to each of the developers, a frequency at which vulnerabilities are attributed to each developer, count of vulnerabilities attributed to each group of developers indicated in the developer metadata, and count of each type of vulnerability attributed to each developer or developer group.

6. The method of claim 4, further comprising:
determining training related information from the developer metadata,
wherein computing the first vulnerability statistic comprises differentiating between a time period prior to training and after training based on the training related information.

7. The method of claim 4, further comprising aggregating respective vulnerability statistics corresponding to a plurality of developers, each of which is associated with an organizational entity as indicated in the metadata from the repository.

8. A system comprising:
a first processor; and
a first memory comprising instructions which, when executed by the first processor causes the system to:
iteratively select each vulnerability indicated in a vulnerability report for a software application;
for the selected vulnerability,
determine a source identifier for a source code unit of the software application associated with the vulnerability based on a descriptor of the selected vulnerability indicated in the vulnerability report;
query a repository with the source identifier and a timestamp of the vulnerability report to identify a set of one or more developers indicated as modifying or creating code of the source code unit at or after the timestamp; and
update an attribution list to attribute the selected vulnerability to the identified set of developers.

9. The system of claim 8, wherein the first memory further comprises instructions to generate statistical information based on the attribution list.

10. The system of claim 9, wherein the instructions to generate statistical information comprise instructions executable by the first processor to cause the system to generate at least one of counts of vulnerabilities attributed per developer, frequency of vulnerability attribution per developer, and counts of vulnerabilities by source code unit type based on assignment of developers to source code unit types.

11. The system of claim 8, wherein the first memory further comprises instructions to determine indications of modifying code is formatting alone and filter out developers returned from the query indicated as formatting alone.

12. A non-transitory storage medium having stored therein instructions executable by a device to perform operations comprising:
determine a plurality of vulnerabilities indicated in a vulnerability report for a software application;
determining from descriptors of the plurality of vulnerabilities a plurality of source unit identifiers that identify source code units of the software application associated with the plurality of vulnerabilities; and
for each of the plurality of vulnerabilities,
querying a repository to identify developers indicated as touching the source code unit identified by the source unit identifier indicated in the descriptor of the vulnerability, wherein touching the source code unit comprises creating or modifying code of the source code unit;
determining for attribution at least one of which of the developers touched the source code unit a number of times that satisfies a frequency threshold, which of the developers last touched the source code unit, and which of the developers touched the source code unit at or after a timestamp of the vulnerability report; and
for those of the developers determined for attribution, attributing the vulnerability to those developers.

13. The non-transitory storage medium of claim 12, wherein attributing comprises generating attribution data that associates the vulnerability with those of the developers determined for attribution to the vulnerability.

14. The non-transitory storage medium of claim 13, wherein the operations further comprising generating statistical information from the attribution data.

15. The non-transitory storage medium of claim 14, wherein generating statistical information from the attribution data comprises at least one of generating counts of vulnerabilities attributed per developer, generating frequency of vulnerability attribution per developer, and generating counts of vulnerabilities by source code unit type based on assignment of developers to source code unit types.

16. The non-transitory storage medium of claim 12, wherein the operations further comprises filtering out developers prior to determining for attribution, wherein the filtering out is based on developer metadata indicating that a developer modifying code was limited to formatting.

* * * * *